(12) United States Patent
Kase et al.

(10) Patent No.: US 6,818,308 B2
(45) Date of Patent: Nov. 16, 2004

(54) GLASS SUBSTRATE FOR DISPLAY AND METHOD OF SELECTING IT

(75) Inventors: Jun-ichiro Kase, Yokohama (JP); Yasuji Fukasawa, Yokohama (JP); Yasumasa Nakao, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 98 days.

(21) Appl. No.: 09/878,413

(22) Filed: Jun. 12, 2001

(65) Prior Publication Data
US 2002/0012160 A1 Jan. 31, 2002

(30) Foreign Application Priority Data

Jun. 13, 2000 (JP) .......................................... 2000-177393
May 15, 2001 (JP) .......................................... 2001-145370

(51) Int. Cl.[7] ............................................. B32B 17/06
(52) U.S. Cl. ................. 428/426; 428/1.1; 428/694 SG; 428/694 BR; 428/410; 428/141; 65/17.1
(58) Field of Search ................................. 428/1.1, 1.62, 428/141, 409, 426; 359/308, 322, 321; 65/378; 313/506; 349/113

(56) References Cited

U.S. PATENT DOCUMENTS

| | | | | | |
|---|---|---|---|---|---|
| 3,652,891 | A | * | 3/1972 | Janning | 313/518 |
| 4,859,636 | A | * | 8/1989 | Aratani et al. | 501/72 |
| 5,589,732 | A | * | 12/1996 | Okibayashi et al. | 313/506 |
| 5,817,383 | A | * | 10/1998 | Takase et al. | 428/1.54 |
| 5,925,438 | A | * | 7/1999 | Ota et al. | 428/141 |
| 6,177,912 | B1 | * | 1/2001 | Izumi | 345/1.3 |
| 6,184,621 | B1 | * | 2/2001 | Horiuchi et al. | 313/586 |
| 6,210,805 | B1 | * | 4/2001 | Sunahara | 428/434 |
| 6,323,932 | B1 | * | 11/2001 | Zhang et al. | 349/155 |
| 6,426,733 | B1 | * | 7/2002 | Yamada | 345/74.1 |
| 6,537,648 | B1 | * | 3/2003 | Takahashi et al. | 428/141 |

* cited by examiner

Primary Examiner—Bruce H. Hess
Assistant Examiner—Tamra L. Dicus
(74) Attorney, Agent, or Firm—Oblon, Spivak, McClelland, Maier & Neustadt, P.C.

(57) ABSTRACT

A glass substrate for a display with a thickness of from 0.3 to 6 mm, which has an average $W_{CA}$ (filtered center line waviness: JIS B0651) of from 0.03 to 0.5 μm measured with a contact-type surface roughness measuring instrument using a phase compensation 2RC zone filter with a cutoff value of 0.8 to 25 mm over a measuring length of 200 mm.

21 Claims, 3 Drawing Sheets

GLASS SUBSTRATE FOR DISPLAY AND METHOD OF SELECTING IT

BACKGROUND OF THE INVENTION

1. Field of the Invention

The present invention relates to a glass substrate for displays. In particular, it relates to a glass substrate for flat panel displays (the generic name for the flat display) such as plasma displays (PDP), TFT liquid crystal displays (TFT-LCD), STN liquid crystal displays (STN-LCD), plasma assist liquid crystal displays (PALC), electroluminescence displays (EL) and field emission displays (FED).

A flat panel display usually uses two glass substrates as the so-called front and rear panels in the case of a plasma display, or as the so-called array-sided and color filter-sided substrate in the case of a TFT liquid crystal display. The present invention relates to these glass substrates.

2. Discussion of Background

A flat panel display usually uses two glass substrates interposes a luminescent system or a light transmission control system between the two glass substrates. Typical glasses used for glass substrates include high strain point glass (such as a product of Asahi Glass Company named PD200) for plasma displays, non alkaline borosilicate glass (such as products of Asahi Glass Company named AN635, AN 100, etc. and a product of Corning Inc. named 1737) for TFT liquid crystal displays and soda lime glass (such as a product of Asahi Glass Company named AS) for STN liquid crystal displays.

These glass substrates are manufactured by the float method, the fusion method, the slit downdraw method and the like. Glass ribbon of even thickness made by these methods is cut into glass substrates of predetermined sizes.

Glass substrates are electric insulators around room temperature and charge up readily when brought into contact with or rubbed with other materials. Because in production of displays, microelectrodes are formed in various patterns on glass substrates, electrically charged glass substrates can cause dielectric breakdown of membrane electrodes. Besides, electrically charged glass substrates tend to attract dust and causes the problem called particle precipitation.

Therefore, a number of charge neutralizers such as ionizers are installed in production lines for flat panel displays. There are various types of ionizers such as the DC type, the AC type and the types utilizing vacuum ultraviolet rays or soft X rays, and the site of use determines the proper choice. However, these ionizers can not prevent glass substrates from electrification though they can neutralize electrically charged glass substrates.

SUMMARY OF THE INVENTION

As described above, charged glass substrates can cause problems of dielectric breakdown and particle precipitation. Electrification caused by contact with and separation from other parts during manufacture is an unavoidable phenomenon.

The above-mentioned contact/peeling electrification is considered to be explained by the following mechanism. When two approaching objects of different materials contact, charge carriers transfer from one object to the other across the interface between them. The distance between their surfaces is supposed to be about 0.2 to 0.8 nm. Electrons, ions, charged fragments from the surfaces of objects and the like are conceivable as charge carriers, but electrons are generally considered to predominantly transfer. As contacting two objects separate, part of the charges on them back off, and the rest remain as electrostatic charges (Yuji Murata: Kotai Butsuri, 27[7], 501–509(1992)).

During manufacture of liquid crystal display panels, glass substrates are brought into contact with and separated from metal plates which serve as holding plates for glass substrates and, in general, charge up negatively, i.e., electrons transfer from metal plates to glass substrates. The mobility of electrons is known to depend on the work function of the metal plate (Hiroyoshi Kitabayashi, et al.: Digest of the 1997 Spring annual meeting of the Japan Society of Applied Physics, 29a-NA-1,376 (1997)). Nickel imparts a smaller electrostatic potential to a glass substrate than aluminum when brought into contact with and separated from the glass substrate. Gold imparts a still smaller electrostatic potential to a glass substrate when brought into contact with and separated from it.

The magnitude of contact/peeling electrification of a glass substrate is known to depend on the contact surface area between the glass substrate and the metal. In other words, a glass substrate is assigned a smaller charge after contact with a metal plate having a rough surface, because the contact surface area between them is small. The charge on a glass substrate increases when contact with a metal is repeated, supposedly because the microscopic contact surface area increases (Hiroyoshi Kitabayashi, et al.: Digest of the 1996 annual meeting of the Institute of Electrostatics Japan, 31–32 (1996)).

The choice of the material and the surface roughness for the metal plate which comes into contact with a glass plate is crucial in order to prevent contact/peeling electrification of glass substrates. Gold is a perfect material for metal plates, as previously mentioned. However, formation of a gold coating on every facility in the production line that comes into contact with a glass substrate would cost a lot and is not a practical solution.

Another factor that affects the charge amount is relative humidity of the atmosphere, and it is known that electrification is unlikely to happen in high humidity. However, because of the problem that dew condensation is likely to arise in high humidity, in actual production processes, flat panel displays are manufactured in low humidity which favors electrification. Therefore, prevention of electrification in the manufacture of flat panel displays is an important subject.

The present invention has been accomplished to solve the above-mentioned problem and provides a glass substrate for a display with a thickness of from 0.3 mm to 6 mm, which has an average $W_{CA}$ (filtered center line waviness: JIS B0610) of from 0.03 to 0.5 $\mu$m measured with a contact-type surface roughness measuring instrument using a phase compensation 2RC zone filter with a cutoff value of 0.8 to 25 mm over a measuring length of 200 mm.

Because of the dependence of the magnitude of contact/peeling electrification of a glass substrate on the contact surface area between the glass substrate and the metal, a glass substrate having the above-mentioned roughness has a small contact surface with a metal and gains a small charge.

In the present invention, the glass substrate for a display is preferably used for a plasma display panel, because most plasma display panels have large surface areas and can make use of the electrification preventing effect advantageously.

The present invention also provides a method of selecting a glass substrate for a display, which comprises inspecting the surface of a glass substrate for a display with a contact-type surface roughness measuring instrument using a phase compensation 2RC zone filter with a cutoff value of 0.8 to 25 mm over a measuring length of 200 mm and then selecting a glass substrate for a display with a thickness of from 0.3 to 6 mm having an average $W_{CA}$ (filtered center line waviness: JIS B0651) of from 0.03 to 0.5 µm.

It is possible to obtain desirable glass substrates by screening glass substrates by this method even if glass substrates having intended properties are not produced in a 100% yield due to change in the production conditions. Namely, though there has been no method of identifying glass substrates which hardly take on electric charge, the present invention facilitates selection of glass substrates which hardly take on electric charge to be used.

DETAILED DESCRIPTION OF THE PREFERRED EMBODIMENTS

Figure 1:
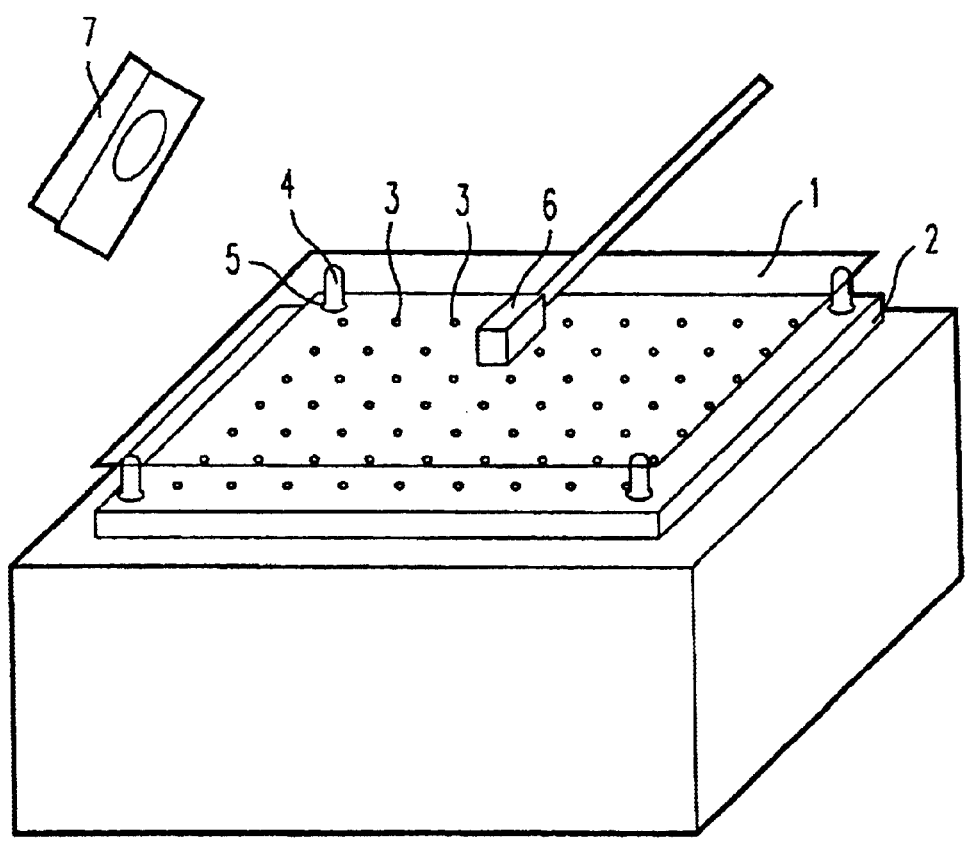
FIG. 1 is a perspective sketch of the instrument used for examination for contact/peeling electrification in the present invention.

In the present invention, the $W_{CA}$ (filtered center line waviness) of a glass substrate is measured by the following method.

For the measurement of $W_{CA}$ (filtered center line waviness), a contact-type surface roughness measuring instrument manufactured by Tokyo Seimitsu Co. Ltd. [trade name: SURFCOM 579A] is used. Firstly, a glass substrate is laid on a measurement table which is larger in size than the glass substrate after the surface of the glass substrate is cleaned and dried thoroughly.

The travel speed of the measurement table is set at 3.0 mm/sec, and inspection of the glass substrate should be started preliminarily from 25 mm ahead of the start point of the measurement on the surface of the glass substrate. The filtered center line waviness curve (JIS B0610) recorded over a measuring length of 200 mm from the starting point with a phase compensation 2RC zone filter with a cutoff value of 0.8 to 25 mm installed in the measuring instrument which uses a lowpass filter with a cutoff value of 0.8 mm and a highpass filter with a cutoff value of 25 mm.

The slope correction of the filtered center line waviness curve is done by the built-in linear correction system in the measuring instrument at a lateral magnification of 1 and a longitudinal magnification of 20,000 (20K) in relation to the measuring direction. The $W_{CA}$ (filtered center line waviness) in the present invention is calculated from the filtered center line waviness curve recorded under the above-mentioned conditions and the measuring length by the built-in calculating machine in the measuring instrument and displayed on the main body of the measuring instrument.

Next, the mechanism of prevention of contact/peeling electrification of glass substrates is explained.

The magnitude of contact/peeling electrification of a glass substrate depends on the work function of the metal plate contacting the glass plate and the contact surface area. The work function is an invariable value intrinsic to each metal. However, it is possible to control the contact surface area by changing the surface roughnesses of the glass substrate and the metal plate and the strength of the hold of the glass substrate. Electron transfer can occur between two surfaces separated by a distance of from about 0.2 to 0.8 nm. An appropriate waviness on the surface of a glass substrate can virtually reduce the contact surface area between the glass substrate and a metal plate and therefore prevents contact/peeling electrification.

In general, the surface of a glass substrate has microscopic irregularities classified as "roughness" components with wavelengths as short as several mm, "ripple" components with wavelengths of from several to tens mm and "warp" components with wavelengths of tens to hundreds mm. With respect to the "roughness", because a metal plate contacting a glass substrate usually has a rougher surface than the glass substrate, it is meaningless to control the "roughness" of the glass substrate. With respect to "warps" with long wavelengths, because when held on a metal plate, a glass substrate elastically deforms to closely stick to the metal plate, control of warps is not effective in preventing electrification.

Meanwhile, the contact surface area between a glass substrate and a metal plate varies with the "ripples" with wavelengths of from several to tens mm on the glass substrate. Ripples with wavelengths of from several to tens mm on a glass substrate show a remarkable effect on the control of the contact surface area.

The ripples on a glass substrate are unequal, and the glass plate contacts a metal plate at the peaks of several to tens protruding ripples. Both the glass and the metal plate deform elastically at these contact points and make contact over a certain contact area. If the amplitude of the irregularities on the glass substrate is small as compared with the cycle of the "ripples", slight elastic deformation results in a large contact surface area increase, and if the amplitude of the irregularities is large, the contact surface area is small.

If the $W_{CA}$ (filtered center line waviness) becomes less than 0.03 µm, the contact surface area increases suddenly, and the magnitude of contact/peeling electrification increases. If the $W_{CA}$ (filtered center line waviness) exceeds 0.5 µm, there is no problem with the magnitude of contact/peeling electrification, but the problem of image distortion arises when a display is assembled. Such a glass substrate is not preferred as a substrate for a display even if the "rippled" surface is used as the outer surface of a display which makes no contribution to the luminescent system or the light transmission control system.

In the present invention, formation of ripples has an effect of preventing electrification only if they are formed on one surface of a glass substrate, namely the surface which is brought into contact with a metal plate. However, because it is generally difficult to form ripples only on one surface of a glass substrate during float forming after melting glass in the manufacture of the glass substrate or the polishing of the glass substrate.

Especially, in a case of a glass substrate for a TFT-LCD, if the $W_{CA}$ (filtered center line waviness) on the surface of the display substrate to be faced toward the liquid crystals is large, cell gaps become uneven, and displayed images becomes uneven. The cell gaps of a TFT-LCD are usually from 2 to 6 µm, and it is preferred that the $W_{CA}$ (filtered center line waviness) is at most 0.2 µm in order to secure uniform cell gaps.

Therefore, in the present invention, the average $W_{CA}$ (filtered center line waviness) has to be from 0.03 to 0.5 µm, preferably from 0.03 to 0.2 µm, more preferably from 0.03 to 0.15 µm.

For production of a glass substrate with periodic ripples, the float method is preferable. The float method is a method for producing flat glass having smooth surfaces by continuously feeding molten glass onto a pool of a molten metal called a float bath to form glass ribbon on the molten metal and smoothing the surface of the glass ribbon by using its own weight. It is highly productive and suitable for production of flat glass with large surface areas.

The sizes of ripples on the surface of flat glass produced by the float method are determined by the conditions for forming glass ribbon, i.e., by the forming history such as the smoothing time which varies with the glass ribbon forming temperature, and the tensile force and contractile force exerted on glass ribbon which vary with the thickness of the glass ribbon. In other words, appropriate adjustment of the conditions for forming glass ribbon such as the glass feed to the float bath, the temperature distribution in the float bath and the glass ribbon forming time allows control of the state of the formed glass ribbon and therefore control of ripples on the surfaces of the resulting flat glass.

In the manufacture of displays, as the size of glass substrates increases, the electrostatic charge increases due to increase of the total charge transfer, and the larger surface area makes destaticization difficult. Therefore, as the size of substrates increases, the effect of prevention of contact/peeling electrification by the ripples on the surface of a glass substrate becomes remarkable. Among flat panel displays, plasma displays have been developed as display panels with large surface areas, and prevention of electrification of glass substrates for plasma display panels is greatly beneficial. Therefore, it is preferred to produce glass substrates by the float method which is suitable for glass with large surface areas.

EXAMPLES

For manufacture of glass substrates, high strain point glass ([product name: PD200] manufactured by Asahi Glass Company) as the base glass was formed into glass ribbon with a 2.8 mm thickness by the float method. The forming conditions such as forming temperature and forming time were varied during the float forming to give three kinds of flat glass with different wavinesses for use as glass substrates (Examples 1 to 3).

As control glass substrates, glass substrates in the same lot as the glass substrates, Example 3, were polished with an Oscar polisher to a 10 μm thickness loss to give glass substrates with smooth examination surfaces (Example 4).

10 glass substrates were prepared under the same conditions in each lot, and the magnitudes of contact/peeling electrification and wavinesses on the surfaces which faced upward during the manufacture by the floating method were examined. The glass substrates were cut into rectangles of 550 mm×650 mm for examination of the magnitudes of contact/peeling electrification and chamfered at the edges. The glass substrates were washed with hydrochloric acid and water and dried thoroughly in hot air before examined in a clean room as described below.

The magnitudes of contact/peeling electrification were examined with the special-purpose experimental instrument shown in FIG. 1. The experimental instrument comprises a horizontal holding stage 2 made of a metal plate to hold a glass substrate 1 by suction, lifting pins 4 sticking into the lifting pin holes 5 in the four corners of the holding stage 2 to hold and lift up and down the glass substrate 1, an electrostatic sensor 6 and an ionizer 7.

As the holding stage 2, a machine-smoothed aluminum plate with an electroless nickel coat was used. Over the almost entire surface of the holding stage 2, holes 3 with 2 mm diameters crisscross at 30 mm intervals so as to be connected to a vacuum pump to suck the glass substrate 1. In the four corners, lifting pin holes 5 with 10 mm diameters are bored to accommodate the lifting pins 4.

The lifting pins 4 have plastic covers on their tips to be brought into contact with the glass substrate 1 (to prevent scratching) and can lift up the glass substrate 1 parallel to the holding stage 2 to an arbitrary level, which was set at 20 mm in the measurement.

As the electrostatic sensor 6, Ionizer checker MODEL 720/720-1 manufactured by Hugle Electronics, Inc. was used. The electrostatic sensor 6 was installed over the center of the glass substrate 1 so that the glass substrate 1 would come to a distance of 10 mm from the electrostatic sensor 6 when the glass substrate 1 was lifted by the lifting pins 4.

As the ionizer 7 to eliminate electricity, Z-stat 6430 blower manufactured by Ion Systems Inc. was used. The ionizer 7 was operated by hand when the glass substrate 1 needed destaticization.

The magnitudes of contact/peeling electrification were examined by the following procedure.

The glass substrate 1 was placed on the holding stage 2, and the lifting pins 4 were plunged to lift the glass substrate 1 to a predetermined level. While the glass substrate was kept there, the glass substrate 1 was destaticized with the ionizer 7 to a charge level of 0. After the charge on the glass substrate 1 became 0, the ionizer 7 was stopped.

Then, the lifting pins 4 were lowered down so as to lay the glass substrate 1 on the holding stage 2, and the glass substrate 1 was held by suction on the stage 2 for 30 seconds there. The sucking was followed by 0.1 second of a blow back (an air blow from the sucking holes 3), and at the same time, the lifting pins 4 were plunged to lift the glass substrate 1 to a halt. At the moment the glass substrate 1 charged up, the maximum electrostatic potential (unit: V) was read by the electrostatic sensor 6.

After the examination of the magnitude of the contact/peeling electrification, a glass substrate 1 was cut into a square of 300 mm×300 mm in size for waviness examination. For the waviness examination, the $W_{CA}$ (filtered center line waviness) of the glass substrate 1 was measured as described previously with a contact-type surface roughness measuring instrument. For each glass substrate 1, the waviness was measured at 10 points, and the average (unit: μm) was calculated. The results of the electrostatic examination are shown in Table 1, and the results of the measurement of $W_{CA}$ are shown in Table 2.

TABLE 1

| Substrate No. | Example 1 | Example 2 | Example 3 | Example 4 |
| --- | --- | --- | --- | --- |
| 1 | −85 | −110 | −390 | −2750 |
| 2 | −96 | −105 | −410 | −3300 |
| 3 | −98 | −98 | −270 | −2450 |
| 4 | −75 | −88 | −360 | −1300 |
| 5 | −92 | −115 | −340 | −2400 |
| 6 | −91 | −103 | −480 | −2300 |
| 7 | −80 | −94 | −540 | −1600 |
| 8 | −94 | −92 | −510 | −2700 |
| 9 | −80 | −119 | −300 | −2200 |
| 10 | −85 | −84 | −370 | −1850 |
| Average | −88 | −100 | −397 | −2285 |

TABLE 2

| Substrate No. | Example 1 | Example 2 | Example 3 | Example 4 |
|---|---|---|---|---|
| 1 | 0.44 | 0.13 | 0.03 | 0.01 |
| 2 | 0.45 | 0.14 | 0.03 | 0.01 |
| 3 | 0.47 | 0.17 | 0.05 | 0.01 |
| 4 | 0.48 | 0.18 | 0.03 | 0.02 |
| 5 | 0.41 | 0.15 | 0.04 | 0.01 |
| 6 | 0.44 | 0.15 | 0.03 | 0.01 |
| 7 | 0.50 | 0.15 | 0.03 | 0.02 |
| 8 | 0.42 | 0.13 | 0.03 | 0.01 |
| 9 | 0.49 | 0.14 | 0.04 | 0.02 |
| 10 | 0.43 | 0.15 | 0.03 | 0.02 |
| Average | 0.45 | 0.15 | 0.03 | 0.01 |
| Min. | 0.41 | 0.13 | 0.03 | 0.01 |
| Max. | 0.50 | 0.18 | 0.05 | 0.02 |

Figure 2:
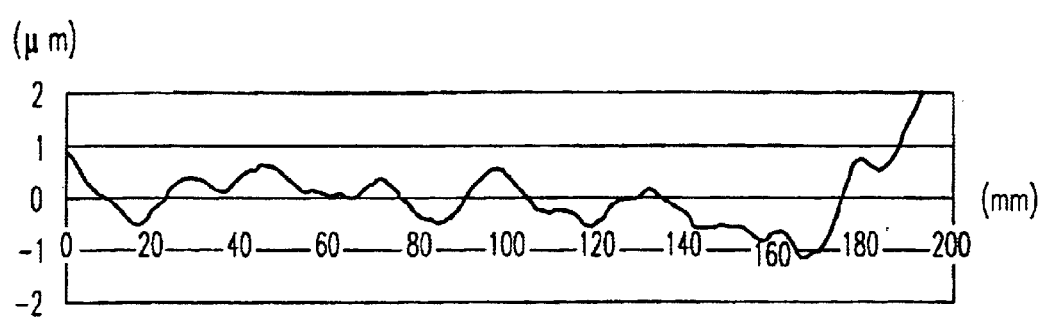
FIG. 2 is the profile of a glass substrate of Example 1.
Figure 3:
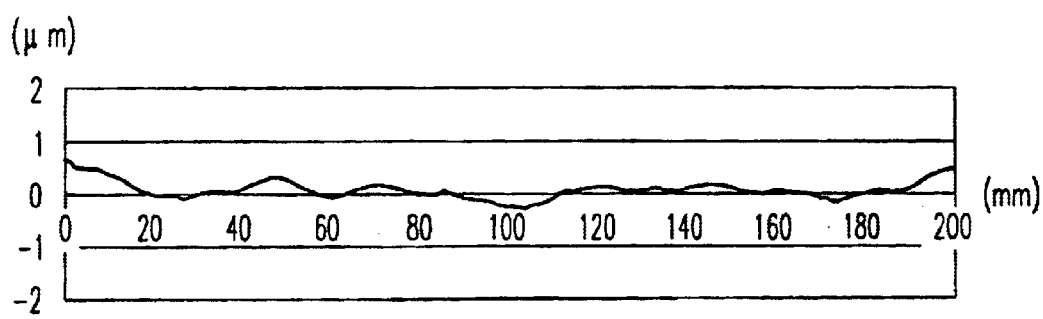
FIG. 3 is the profile of a glass substrate of Example 2.
Figure 4:
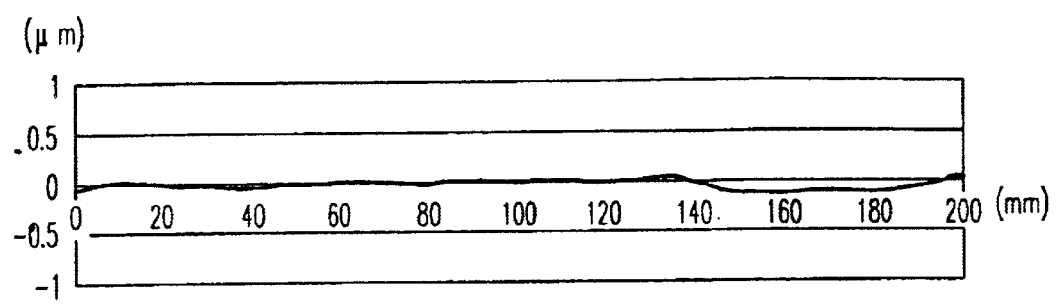
FIG. 4 is the profile of a glass substrate of Example 3.
Figure 5:
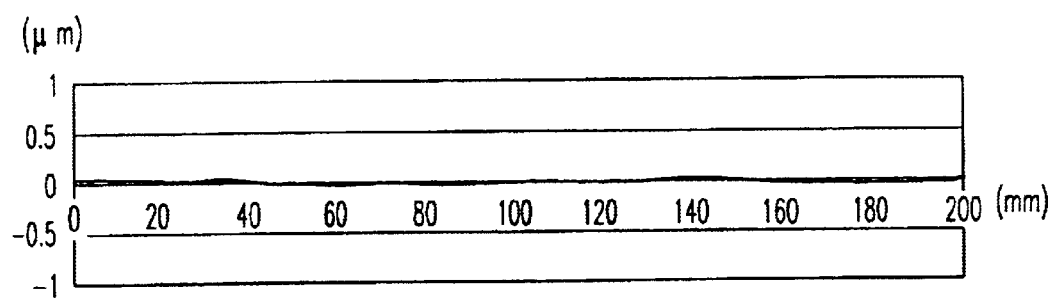
FIG. 5 is the profile of a glass substrate of Example 4.

For profiling of the glass substrates, the data obtained by the contact-type surface roughness measuring instrument were input into a personal computer and plotted. For Examples 1 to 4, the results of the profiling of the typical one, Substrate No. 1, of each lot (comprising Substrates Nos. 1 to 10) are shown in FIGS. 2 to 5. Namely, the profile of the typical example of Example 1 is shown in FIG. 2, the profile of the typical example of Example 2 is shown in FIG. 3, the profile of the typical example of Example 3 is shown in FIG. 4, and the profile of the typical example of Example 4 is shown in FIG. 5.

According to the above examination results, the average $W_{CA}$ was 0.45 μm for the lot of Example 1, and 0.15 μm for the lot of Example 2, and the electrostatic potentials of any substrates in these lots were as low as about −100 V. With respect to the lot of Example 3, the average $W_{CA}$ was as small as 0.03 μm, and the electrostatic potential were slightly high, about −400 V. In contrast, with respect to the polished substrates in the lot of Example 4, the averaged $W_{CA}$ was as smalls as 0.01 μm, and the electrostatic potentials were incommensurable and as high as about −2000 V, which indicated large electrostatic charges.

These results indicate that the magnitude of contact/peeling electrification of a glass substrate 1 having ripples at an appropriate amplitude on the surface which comes into contact with the holding stage 2 is small.

Then, the metal plate as the holding stage 2 of the experimental instrument was replaced by a glass plate to measure the contact surface area of the glass substrate 1 held by suction. The glass plate was a soda lime glass plate with a 20 mm thickness which had the same holes and pores as the metal plate to lift up and down and suck the glass substrate 1.

Flat glass having a thickness of at least 8 mm can be obtained with smaller waviness than flat glass having a thickness of at most 6 mm, since for manufacture of flat glass having a thickness of at least 8 mm by the float method, both sides of the glass ribbon have to be held laterally during forming. Therefore, flat glass having a 20 mm thickness has small ripples.

Glass substrate No. 1 of each of Examples 1 to 4 was loaded on the experimental instrument and sucked, and the pattern of the interference fringes was observed under a Na lamp (wavelength 589 nm). The interference fringes were spaced at 295 nm intervals, which indicate a level difference of about 0.3 μm. The warp of the glass substrate 1 is indicated by the contours of the interference fringes, and the ripples of the glass substrate 1 are recognized as jagged zigzags of the interference fringes.

Glass substrates 1 of Examples 1 to 3 showed interference fringes jagged with pitches of from 5 to 50 mm when laid on the experimental instrument. When these glass substrates 1 were held by suction on the glass plate, the first dark interference fringe indicating a contour at a distance of about 0.15 μm from the glass plate changed to a distorted circle with a diameter of at most 3 cm.

On the other hand, the glass substrate 1 of Example 4 did not show jagged interference fringes when laid on the experimental instrument. When the glass substrate was held by suction on the glass plate, the first dark interference fringe spread unevenly to a diameter of from 5 to 10 cm.

These results indicate that a glass substrate 1 with a smaller waviness contacts the glass plate over a larger surface area when being held by suction on the glass plate.

The glass substrate of the present invention can prevent contact/peeling electrification during manufacture of flat panel displays. Therefore, it is possible to solve the problems of dielectric breakdown of membrane electrodes and particle precipitation and improve the quality of flat panel displays.

The entire disclosures of Japanese Patent Application Nos. 2000-177393 filed on Jun. 13, 2000 and 2001-145370 filed on May 15, 2001 including specifications, claims, drawings and summaries are incorporated herein by reference in its entireties.

What is claimed is:

1. A glass substrate having a thickness of from 0.3 to 6 mm, and an average $W_{CA}$ (filtered center line waviness according to JIS B0610) of from 0.03 to 0.5 μm measured with a contact-type surface roughness measuring instrument using a phase compensation 2RC zone filter with a cutoff value of 0.8 to 25 mm over a measuring length of 200 mm.

2. A plasma display panel comprising the glass substrate of claim 1.

3. A method of selecting a glass substrate for a display comprising:
   inspecting the surface of a glass substrate with a contact-type surface roughness measuring instrument using a phase compensation 2RC zone filter with a cutoff value of 0.8 to 25 mm over a measuring length of 200 mm, and then
   selecting a glass substrate with a thickness of from 0.3 to 6 mm having an average $W_{CA}$ (filtered center line waviness according to JIS B0610) of from 0.03 to 0.5 μm.

4. The glass substrate of claim 1, wherein the average $W_{CA}$ is from 0.03 to 0.2 μm.

5. The glass substrate of claim 1, wherein the average $W_{CA}$ is from 0.03 to 0.15 μm.

6. A flat panel display comprising the glass substrate of claim 1, wherein the flat panel display is selected from the group consisting of a plasma display, a TFT liquid crystal display, a STN liquid crystal display, a plasma assist liquid crystal display, an electroluminescence display, and a field emission display.

7. The flat panel display of claim 6, wherein the flat panel display is a TFT liquid crystal display.

8. The flat panel display of claim 6, wherein the flat panel display is a STN liquid crystal display.

9. The flat panel display of claim 6, wherein the flat panel display is a plasma assist liquid crystal display.

10. The flat panel display of claim 6, wherein the flat panel display is an electroluminescence display.

11. The flat panel display of claim 6, wherein the flat panel display is a field emission display.

12. A method of reducing contact/peeling electrification of a glass substrate during the manufacture of a flat panel display comprising:

preparing a glass substrate having a thickness of from 0.3 to 6 mm, and an average $W_{CA}$ (filtered center line waviness according to JIS B0610) of from 0.03 to 0.5 μm measured with a contact-type surface roughness measuring instrument using a phase compensation 2RC zone filter with a cutoff value of 0.8 to 25 mm over a measuring length of 200 mm, manufacturing a flat panel display comprising the glass substrate.

13. The method of claim 12, wherein the average $W_{CA}$ is from 0.03 to 0.2 μm.

14. The method of claim 12, wherein the average $W_{CA}$ is from 0.03 to 0.15 μm.

15. The method of claim 12, wherein the flat panel display is selected from the group consisting of a plasma display, a TFT liquid crystal display, a STN liquid crystal display, a plasma assist liquid crystal display, an electroluminescence display, and a field emission display.

16. The method of claim 12, wherein the flat panel display is a plasma display.

17. The method of claim 12, wherein the flat panel display is a TFT liquid crystal display.

18. The method of claim 12, wherein the flat panel display is a STN liquid crystal display.

19. The method of claim 12, wherein the flat panel display is a plasma assist liquid crystal display.

20. The method of claim 12, wherein the flat panel display is an electroluminescence display.

21. The method of claim 12, wherein the flat panel display is a field emission display.

* * * * *